United States Patent
Nisbet et al.

(10) Patent No.: US 7,814,336 B1
(45) Date of Patent: Oct. 12, 2010

(54) METHOD AND APPARATUS FOR PROTECTION OF TIME-LIMITED OPERATION OF A CIRCUIT

(75) Inventors: Stuart A. Nisbet, Edinburgh (GB); Gareth D. Edwards, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 1217 days.

(21) Appl. No.: 11/179,451

(22) Filed: Jul. 12, 2005

(51) Int. Cl.
G06F 21/00 (2006.01)

(52) U.S. Cl. .................. 713/193; 726/26; 708/252

(58) Field of Classification Search .............. 380/44, 380/46, 47; 713/168, 169, 170, 193; 716/16, 716/17; 235/492; 726/26; 708/252
See application file for complete search history.

(56) References Cited

U.S. PATENT DOCUMENTS

| | | | |
|---|---|---|---|
| 4,341,925 A * | 7/1982 | Frosch et al. ............... 380/262 |
| 6,173,235 B1 | 1/2001 | Maeda |
| 6,198,301 B1 | 3/2001 | Chetlur et al. |
| 6,336,208 B1 | 1/2002 | Mohan et al. |
| 6,446,242 B1 | 9/2002 | Lien et al. |
| 6,617,990 B1 * | 9/2003 | Lorenzo-Luaces et al. .. 341/144 |
| 6,618,839 B1 | 9/2003 | Beardslee et al. |
| 6,747,480 B1 | 6/2004 | Kaptanoglu et al. |
| 6,874,107 B2 | 3/2005 | Lesea |
| 6,876,186 B1 | 4/2005 | Gupta |
| 6,883,717 B1 * | 4/2005 | Kelley et al. .............. 235/492 |
| 7,028,281 B1 | 4/2006 | Agrawal et al. |
| 7,376,929 B1 * | 5/2008 | Grant ...................... 716/16 |
| 7,484,081 B1 * | 1/2009 | Langhammer et al. ......... 713/1 |
| 2002/0010853 A1 | 1/2002 | Trimberger et al. |
| 2002/0093356 A1 | 7/2002 | Williams et al. |
| 2003/0023912 A1 | 1/2003 | Lesea |
| 2003/0172363 A1 | 9/2003 | Chauhan et al. |
| 2004/0024806 A1 | 2/2004 | Jeong et al. |
| 2004/0236961 A1 * | 11/2004 | Walmsley ................... 713/200 |
| 2005/0040855 A1 | 2/2005 | Boerstler et al. |
| 2005/0102539 A1 | 5/2005 | Hepner et al. |
| 2006/0049886 A1 | 3/2006 | Agostinelli et al. |
| 2006/0075374 A1 | 4/2006 | McElvain |
| 2006/0215743 A1 | 9/2006 | Lang et al. |

OTHER PUBLICATIONS

U.S. Appl. No. 10/985,508, filed Nov. 10, 2004, Grant.
U.S. Appl. No. 11/067,423, filed Feb. 25, 2005, Donlin et al.
U.S. Appl. No. 12/052,015, filed Mar. 20, 2008, Douglas.

(Continued)

*Primary Examiner*—Carl Colin
*Assistant Examiner*—Thong Truong
(74) *Attorney, Agent, or Firm*—LeRoy D. Maunu

(57) ABSTRACT

A method and apparatus for improving enforcement of the time-limited operation of a programmable device. Two random number generators, e.g., linear feedback shift register (LFSR) circuits, are utilized in which a first LFSR provides free-running capability, while a second LFSR provides time-sensitive capability. The states of the two LFSR circuits are compared by various portions of the programmable device at each state transition in order to obtain authorization to continue operation. Authorized operation continues as long as the states of both LFSRs are equivalent, or at least equivalent, within a given phase offset. Once a terminal count of the time-sensitive LFSR is reached, then authorization for continued operation ends and at least a portion of the programmable device is disabled.

20 Claims, 5 Drawing Sheets

OTHER PUBLICATIONS

U.S. Appl. No. 12/052,013, filed Mar. 20, 2008, Douglas.

Dini Group, The, "PCI Hosted, ASIC Prototyping Engine," DN2000k10 product specification, May 2000, pp. 1-3, available from www.dinigroup.com.

Goering, Richard, "'Digital Signature' technology aids IP protection," EE Times, Mar. 25, 1998, pp. 1-2, downloaded from http://www.eetimes.com/news/98/1000news/digital.html on Oct. 14, 2007.

Jain, Adarsh K. et al., "Zero Overhead Watermarking Technique for FPGA Designs," Proceedings of the 2003 ACM Great Lakes Symposium on VLSI (GLSVLSI '03), Apr. 28-29, 2003, pp. 147-152, Washington, DC.

Kahng, Andrew B. et al., "Constraint-Based Watermarking Techniques for Design IP Protection," IEEE Transactions on Computer-Aided Design of Integrated Circuits and Systems, Oct. 2001, pp. 1236-1252, vol. 20, No. 10.

Lach, John et al., "Robust FPGA Intellectual Property Protection Through Multiple Small Watermarks," Proceedings of the 36th ACM/IEEE Conference on Design Automation (DAC'99), Jun. 21-25, 1999, pp. 831-836, New Orleans, Louisiana.

Touba et al., "Altering a Pseudo-Random Bit Sequence for Scan-Based BIST", International Test Conference, 1996 IEEE, Oct. 20-25, 1996, Paper 7.1, pp. 167-175.

Kohlbrenner, et al., "An Embedded True Random Number Generator for FPGAs", FPGA '04, Feb. 22-24, 2004, pp. 71-78, Monterey, CA, ACM.

Tsoi et al., "Compact FPGA-based True and Pseudo Random Number Generators", 2003 IEEE, Proceedings 11th Annual IEEE Symposium on Field Programmable Custom Compiling Machines (FCCM'03), Apr. 9-11, 2003, pp. 51-61.

Jas et al., "Hybrid BIST Based on Weighted Pseudo-Random Testing: A New Test Resource Partitioning Scheme"; 2001 IEEE, Proceedings 19th IEEE VLSI Test Symposium, Apr. 29-May 3, 2001, pp. 2-8.

Krishna et al. "Hybrid BIST Using an Incrementally Guided LFSR", 2003 IEEE, Proceedings of the 18th IEEE International Symposium on Defect and Fault Tolerance in VLSI Systems (DFT'03), Nov. 3-5, 2003, pp. 217-224.

Fischer et al., "True Random Number Generator Embedded in Reconfigurable Hardware", 2002 CHES, 4th International Workshop, Proc. Workshop Cryptographic Hardware and Embedded Systems (CHES '02), pp. 415-430, Aug. 13-15, 2002. Redwood City, California.

"The Controversial Bits", Sep. 24, 2004, p. 1 of 1, available from http://people.freenet.de/s.urfer/conditioning.htm.

"Hot Electron Effects", Specific Concerns in Space Applications, Jul. 9, 2004, p. 1 of 1, available from http://nepp/nasa.gov/index_nasa.cfm/909/.

Clement, J.J. et al., "Methodology for Electromigration Critical Threshold Design Rule Evaluation", May 1999, 1 page (abstract) available from http://ieeexplore.ieee.org/xpl/abs_free.jsp?arNumber=759073.

Watts, Joe et al., "Hot Electron Degradation in SOI MOSFETs", Annual Research Summary Section 8, Jul. 1, 1994-Jun. 30, 1995, 1 page, available from http://dynamo.ecn.purdue.edu/ECE/Research/ARS/ARS95/Sec8/8_24.html.

Luryi, Serge et al., "Hot Electron Injection Devices", Nov. 27, 1984, Superlattices and Microstructures, vol. 1, No. 5, 1985, pp. 389-400, available from AT&T Bell Laboratories, Murray Hill, N.J. 07974 or Bell Communication Research, Murray Hill, N.J. 07974.

Gladkikh, A. et al., "Correlation Between Electromigration Damage Kinetics and Microstructure in Cu Interconnects", 1995, 4 pages, available from Department of Physical Electronics, Tel Aviv University, Ramat Aviv 69978, Israel.

"Electromigration", pp. 1-4, Aug. 16, 2004, available from http://en.wikipedia.org/wiki/Electromigration.

Peters, Laura, "Early Failures are Key in Copper Electromigration", Semiconductor International, Jul. 1, 2002, 1 page, available from http://www.keepmedia.com:/jsp/article_detail_print.jsp.

Sanchez, Julian J., "Hot-Electron Resistant Device Processing and Design: A Review", Feb. 1989, pp. 1-8, available from IEEE, 3 Park Avenue, 17th Floor, New York, NY 10016-5997.

"Choosing the Right Silicon Solution", EETimes, Sep. 27, 2004, pp. 1-3, available from Electronic Engineering Times, at http://www.eetimes.com.

Sullivan, Tim, "Electromigration", IBM Microelectronics, Jul. 9, 2004, 3 pages, available from http://www.irps.org/irw/99/Tuts.htm.

Chang, Chih-Wei (Jim), "Layout-Driven Hot-Carrier Degradation Minimization Using Logic Restructuring Techniques", 2001, pp. 1-6, available from Department of Electrical and Computer Engineering, University of California, Santa Barbara, DAC 2001, Jun. 18-22, 2001, Las Vegas, Nevada.

Lloyd, J.R., "Electromigration for Designers: An Introduction for the Non-Specialist", IBM TJ Watson Research Center, Apr. 12, 2002, pp. 1-9, available at http://www.techonline.com/community/home/20421.

Tyree, Vance C., "Reliability in CMOS IC Design: Physical Failure Mechanisms and their Modeling", Jun. 23, 2000, pp. 1-8, available from http://www.mosis.com/Faqs/tech_cmos_rel.pdf.

* cited by examiner

METHOD AND APPARATUS FOR PROTECTION OF TIME-LIMITED OPERATION OF A CIRCUIT

FIELD OF THE INVENTION

The present invention generally relates to programmable logic devices (PLDs), and more particularly to the enforcement of time-limited operation of the PLDs.

BACKGROUND

PLDs are a well-known type of integrated circuit that may be programmed to perform specified logic functions. One type of PLD, the Field Programmable Gate Array (FPGA), typically includes an array of programmable tiles. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, lookup tables (LUTs), function generators, registers, arithmetic logic, and so forth.

The programmable interconnect and the programmable logic are typically programmed by loading a stream of configuration data into internal configuration memory cells that define how the programmable elements are configured. The configuration data may be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to Input/Output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored off-chip in non-volatile memory, then downloaded to volatile memory as part of an initial configuration sequence.

For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Some PLDs, such as the Xilinx Virtex™ FPGA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

The cores may be designed by a particular vendor for evaluation testing that is to be performed by a user (e.g., a potential customer for the cores) over a limited period of time. Generally, several hours of operation is often adequate for the user to make a fair evaluation of the core's utility. Once the evaluation time period expires, however, the core's functionality may be disabled, which causes the core to cease functioning in its intended manner.

Protection circuitry may be used to enforce the expiration of the evaluation period and to prevent the continued use of the core beyond the intended evaluation period. In particular, a counter may be used in conjunction with a comparator, such that when a terminal count is reached, the output of the comparator asserts a deactivation signal, which renders the core non-functional. For example, given a 42-bit counter running at 156.25 MHz, a terminal count starting from a reset condition is reached in approximately 7.8 hours. Thus, the user is given nearly 8 hours in which to evaluate the core for his or her use.

Alternatively, the counter may be replaced with a linear feedback shift register (LFSR), which provides an equivalent amount of time with which to evaluate the core, but protects the enforcement of the evaluation period in a more secure manner. In particular, since the output of the LFSR is pseudo-random, the terminal count becomes more difficult to detect and consequently, more difficult to defeat.

Common with the counter-based and LFSR-based protection circuits, however, is the "inhibit" signal that is generated by the protection circuits to render the evaluation core unusable. If a particularly malevolent user were to locate this inhibit signal, then knowledge of the terminal count would not be necessary to disable the protection circuit. All that is necessary for the user to continue unauthorized access of the evaluation core is to locate the inhibit signal, disconnect it from the inhibit circuitry, and continuously apply a logic signal that maintains the evaluation core in its operational state. Both protection schemes, therefore, provide a single point of weakness, which is relatively easy to defeat.

SUMMARY

To overcome limitations in the prior art, and to overcome other limitations that will become apparent upon reading and understanding the present specification, various embodiments of the present invention disclose an apparatus and method for a programmable logic device that provides an improved mechanism for enforcing the time-limited operation of programmable logic devices (PLDs).

In accordance with one embodiment of the invention, a method of limiting operation of a protected circuit comprises generating first authentication states using a first pseudo-random number (PN) generator of the protected circuit, generating second authentication states using a second PN generator of the protected circuit, comparing the first authentication states to the second authentication states, activating the protected circuit for operation in response to a positive comparison between the first and second authentication states, and deactivating the protected circuit for operation in response to a negative comparison between the first and second authentication states.

In accordance with another embodiment of the invention, a programmable logic device (PLD) comprises a plurality of reconfigurable logic resources that are coupled to receive configuration data and are adapted to implement a plurality of logic functions in response to the configuration data. The PLD further comprises a protected core implemented by a first portion of the reconfigurable logic resources. The protected core includes a first sequence generator that is adapted to generate a first validation sequence, a plurality of second sequence generators that are adapted to generate respective second validation sequences, and a plurality of protected circuits that are coupled to receive the first validation sequence, where each protected circuit is also coupled to receive a respective one of the plurality of second validation sequences. An operational state of each protected circuit is established in response to a comparison of the first validation sequence with the respective second validation sequence.

In accordance with another embodiment of the invention, a computer-readable medium contains instructions which are executable by a computing system for synthesizing a reconfigurable logic design. The instructions perform steps that comprise receiving source code indicative of a programmable logic design and synthesizing the source code into configuration data. The synthesizing step includes generating a protected circuit definition, generating at least two pseudo-random number (PN) generators, and generating at least one authentication circuit. The authentication circuit compares outputs of the at least two PN generators to validate operation of the protected circuit in response to a positive comparison.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
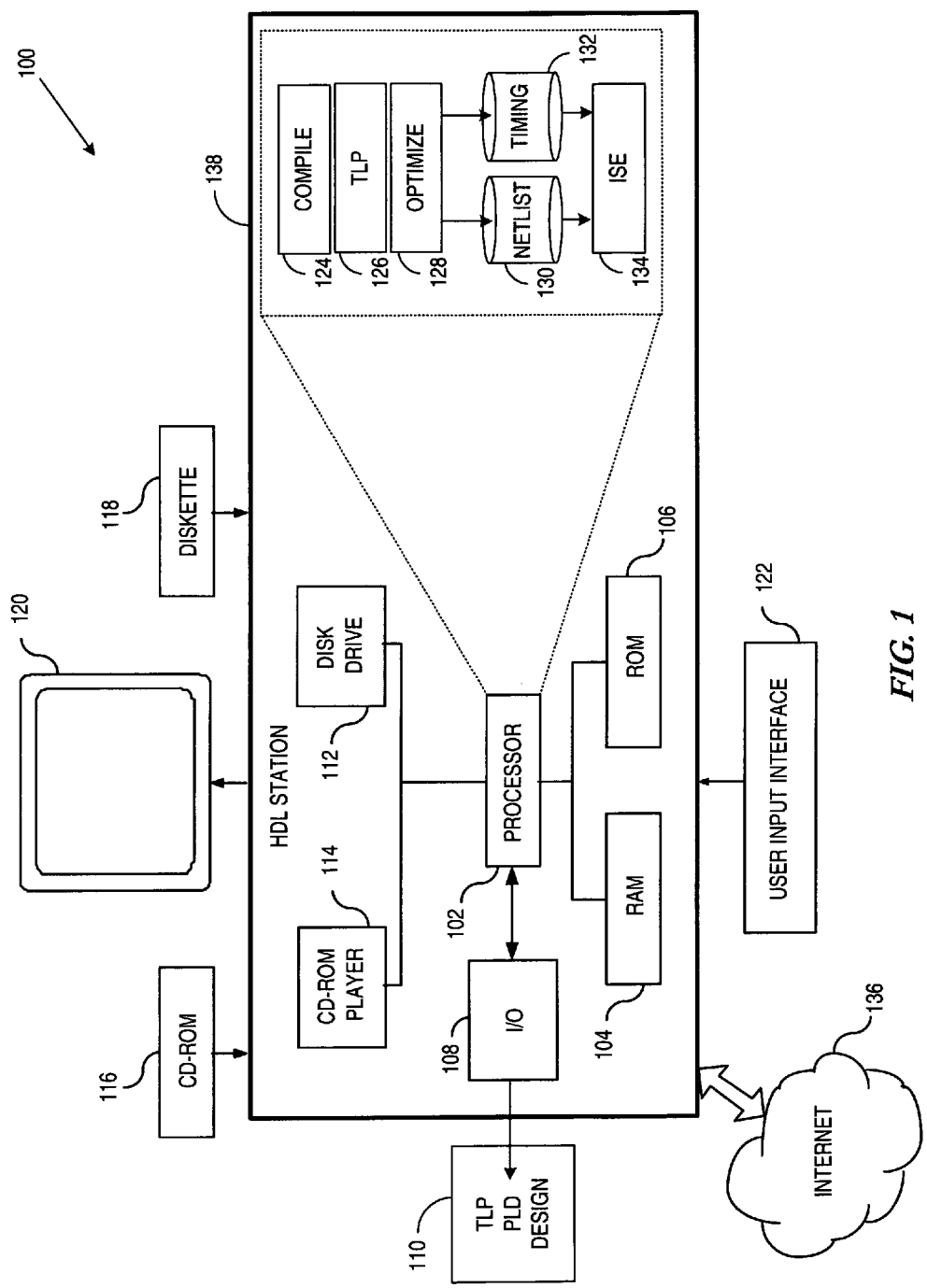
FIG. 1 illustrates an exemplary hardware description language development station.

Generally, various embodiments of the present invention provide a method and apparatus for improving enforcement of the time-limited operation of a programmable logic device (PLD). Two random number generators, e.g., linear feedback shift register (LFSR) circuits, are utilized in which a first LFSR provides free-running capability, while a second LFSR provides time-sensitive capability. The states of the two LFSR circuits are compared by various portions of the PLD at each state transition in order to obtain authorization to continue operation. Authorized operation continues as long as the states of both LFSRs are equivalent, or at least equivalent within a given phase offset.

The states of the two LFSRs are equivalent as long as the terminal value of the time-sensitive LFSR is not reached. Once the terminal value is reached, however, additional logic associated with the time-sensitive LFSR is used to perturb the state of the time-sensitive LFSR. As such, various portions of the PLD detect the perturbation and subsequently inhibit the continued operation of the protected core, or at least sub-blocks of logic resources located within the protected core. The perturbation may include, but is not limited to, the inversion of one or more bits that define the time-sensitive LFSR's state or an entire initialization of the time-sensitive LFSR's state. The perturbation is effective to render one or more sub-blocks of logic resources within the protected core inoperable until a reconfiguration of the protected core is performed. It should be noted, that the state of the time-sensitive LFSR may be perturbed in many different ways as may be recognized by one of ordinary skill in the art, so long as the perturbation may be detected in a comparison operation between the free-running and the time-sensitive LFSR circuits.

The LFSR protection circuits are placed within the protected core at various levels of a design hierarchy. In one embodiment of the present invention, a time-sensitive LFSR is placed at or near the top of the design hierarchy and one or more free-running LFSRs are placed closer to one or more sub-blocks of logic resources within the protected core. As discussed in more detail below, such a configuration lends itself to an improved defense to attack at or near each sub-block of logic resources.

In an alternative embodiment of the present invention, a free-running LFSR is instead placed at or near the top of the design hierarchy and one or more time-sensitive LFSRs are placed closer to one or more sub-blocks of logic resources within the protected core. In this instance, the design is conducive to the protection of multiple sub-blocks within the protected core, whereby each sub-block may exhibit its own time-sensitive LFSR having a unique terminal count, which may then be compared to the state of the free-running LFSR for authentication. As such, each protected sub-block may separately "time-out" to provide independent protection for each sub-block of logic resources within the protected core.

The protected core and its associated LFSR protection circuits may be realized by the user at a hardware description language (HDL) development station as exemplified in FIG. 1. Verilog and VHDL represent two of the more popular HDL languages in use today, which may be used to define the structure of a PLD based design. In particular, HDL facilitates a description of the manner in which a design is decomposed into sub-blocks of logic resources and further allows a description of the manner in which each sub-block of the design is to be interconnected.

The exemplary computing arrangement that is suitable for performing HDL definition activities in accordance with at least one embodiment of the present invention includes HDL station 138, which includes a central processor (CPU) 102 coupled to random access memory (RAM) 104 and read-only memory (ROM) 106. The ROM 106 may also be other types of storage media to store programs, such as programmable ROM (PROM), electronically erasable PROM (EEPROM), etc. The processor 102 may communicate with other internal and external components through input/output (I/O) circuitry 108 to provide, for example, a configuration bit stream to define a time-limited protected PLD design 110.

HDL station 138 may also include one or more data storage devices, including hard and floppy disk drives 112, CD-ROM drives 114, and other hardware capable of reading and/or storing information such as DVD, etc. Software for facilitating the definitions of the protected core in accordance with an embodiment of the present invention may be stored and distributed on a CD-ROM 116, diskette 118 or other form of media capable of portably storing information. These storage media may be inserted into, and read by, devices such as the CD-ROM drive 114, the disk drive 112, etc. The term "medium", as used herein, includes disks or memory, however, it does not include wires, air, or a vacuum.

The software for facilitating the definitions of the protected core may also be transmitted to HDL station 138 via data signals, such as being downloaded electronically via a network, such as Internet 136. HDL station 138 may be coupled to a display 120, which may be any type of known display or presentation screen, such as LCD displays, plasma display, cathode ray tubes (CRT), etc. A user input interface 122 may be provided, including one or more user interface mechanisms such as a mouse, keyboard, microphone, touch pad, touch screen, voice-recognition system, etc.

Processor 102 may be used to execute core synthesis tools 124-134 to aid the minimization and optimization of the equations extracted from the HDL files. Compiler 124, for example, may parse through the HDL behavioral source code to extract known functions, e.g., arithmetic functions, multiplexers, memories, etc. Time-limited protection (TLP) block 126 then allocates and distributes the protection circuits throughout the design as is required by the particular protected design being generated.

Optimize block 128, net list 130, timing 132, and integrated software environment (ISE) block 134 each interoperate to formulate a design that is substantially dependent upon the intended PLD target's architecture and context. The context, for example, may influence inter-function optimizations such as replication, merging, re-timing, and pipelining. The context may be defined by the timing requirements and topology of the design. Once the design is synthesized, it may be realized within TLP PLD design 110, a portion of which is exemplified by PLD 202 of FIG. 2.

Figure 2:
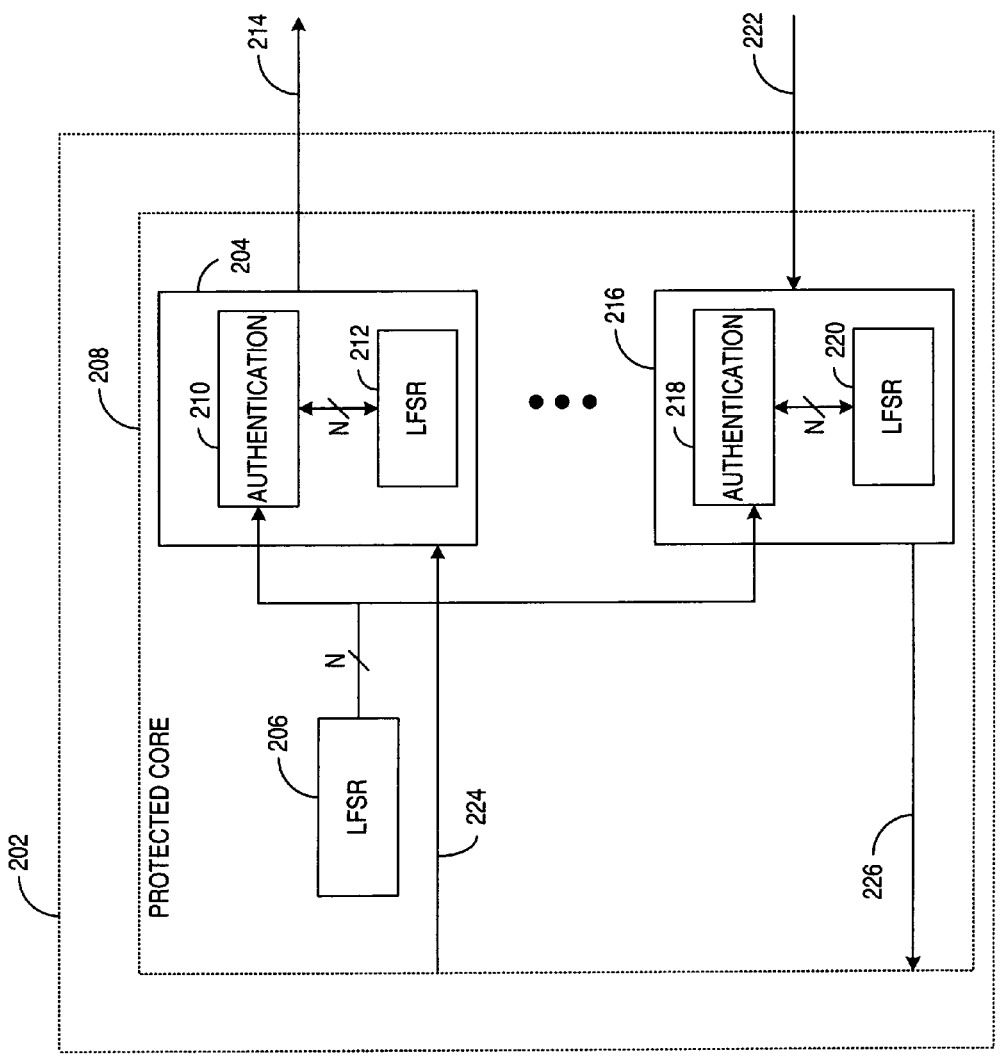
FIG. 2 illustrates one embodiment of a time-limited protected (TLP) programmable logic device (TLP) in accordance with various embodiments of the present invention.

The realization of a protected core within TLP PLD design 110 is illustrated by protected core 208 of PLD 202 in FIG. 2. The realization of a protected core may also be referred to as a "protected circuit." Protected core 208 is representative of virtually any programmable function that may be configured within PLD 202. Generally, protected core 208 enforces time-limited operation of sub-blocks 204 and 216 by embedding LFSRs 206, 212, and 220 within protected core 208. As such, authentication of protected core 208 is performed internally within protected core 208, which eliminates external authentication I/O, thus enhancing secure operation.

Protected core 208 may represent, for example, a 10 gigabit Ethernet Media Access Controller (MAC) to enable the design of high speed Ethernet systems and subsystems. Protected core 208, therefore, may offer sub-blocks 204 and 216 as the transmission and reception blocks, respectively, of the Ethernet MAC core. As such, sub-block 204 receives data 224 from an internal PLD interface, which may then be formulated for transmission as data 214 to a physical layer (PHY) device, such as an optical module (not shown), in accordance with the MAC protocol. Similarly, sub-block 216 may receive data 222 from the PHY device and may deliver the data to internal PLD interface 226 for further processing, for example, by the transmission control protocol/internet protocol (TCP)/(IP) layers of the MAC protocol. Note that in general protected core 208 may be any type of core for performing any arbitrary function. Also, a protected core 208 may include an arbitrary number of sub-blocks, and the sub-blocks may be provided by one or more different core vendors. Finally, although only one protected core 208 is shown, a PLD 202 may include any number of protected cores in accordance with embodiments of the present invention.

In accordance with one embodiment of the present invention, TLP block 126 of the synthesis tools of FIG. 1 instantiates a first pseudo-random number (PN) generator, e.g., LFSR 206, as a free-running LFSR, while second and third pseudo-random number generators, e.g., LFSR 212 and LFSR 220, are instantiated as time-sensitive LFSRs. As such, the state space of LFSRs 206, 212, and 220 may be defined using an N-bit value that changes at each clock cycle. Since LFSRs 206, 212, and 220 represent, for example, a pseudo-random number generator, each respective state space repeats itself after $2^N-1$ state transitions. Typically, LFSRs 206, 212, and 220 will be clocked using a common clock signal, or a common frequency, such that the LFSRs change state in lock step.

Incorporated within time-sensitive LFSRs 212 and 220, however, are comparison blocks (not shown) that compare the current state of the LFSR, i.e., the logic value of each shift register's contents, with a predetermined terminal state. If the current state equals the terminal state, then time-sensitive LFSRs 212 and 220 perturb their respective shift register contents in some manner. The perturbation may be as minor as a logic inversion of the logic value contained within one of the shift registers, or may constitute a complete initialization of each shift registers' contents. The terminal state may be any predetermined state that may be chosen based on a desired evaluation testing time.

In order to detect the perturbation, sub-blocks 204 and 216 provide additional logic, i.e., authentication blocks 210 and 218, respectively. Authentication blocks 210 and 218 may be used to compare the current state of LFSRs 212 and 220 to the current state of LFSR 206. Should the comparison yield equality, which may indicate that no perturbation has taken place, then in one embodiment, sub-blocks 204 and 216 are authenticated for continued operation. On the other hand, if a perturbation has taken place, thereby indicating that the time period for valid operation has expired, then the authentication blocks are effective to disable the operation of their respective sub-blocks, as will be discussed in more detail below.

Each of LFSRs 206, 212, and 220 may be implemented using a serial combination of N shift registers. As such, at any given point in time, N bits corresponding to the N logic values contained within the N shift registers may be received from LFSR 206 and LFSR 212 for comparison by authentication block 210. Similarly, authentication block 218 may receive N bits from LFSR 206 and LFSR 220 for comparison. Thus, in one embodiment, authentication blocks 210 and 218 each perform an N-bit wide comparison in order to authenticate the continued operation of sub-blocks 204 and 216.

In an alternative embodiment, the number of authentication blocks in each sub-block may be increased, such that each authentication block may receive fewer than N bits for comparison. If, for example, two authentication blocks are provided per sub-block, then m bits (where m<N) may be compared by one of the authentication blocks, and N-m bits may be compared by the other authentication block. In such an instance, both outputs of the two authentication blocks are required to indicate that operation is to continue before the sub-block is actually authenticated for continued operation.

If, on the other hand, N authentication blocks are provided within each sub-block, then each bit of LFSR 206 may be compared with each corresponding bit of LFSR 212 or 220 by each of the respective N authentication blocks. In this instance, only when the output of each of the N authentication blocks indicate that operation is to continue will each of sub-blocks 204 and 216 be authenticated for continued operation.

As is illustrated in FIG. 2, any number of sub-blocks may be provided in any given protected core 208. Thus, any number of LFSRs and associated authentication blocks may be instantiated by TLP of 126 of FIG. 1. Thus, LFSRs 212 and 220 may each be initialized with varying terminal states, whereby the authenticated operational time window for each protected sub-block may be programmed differently.

Further, the individual programmability of LFSRs 212 and 220 may be initialized to implement a known phase offset between the state transitions defined by LFSR 206 and the state transitions defined by LFSRs 212 and 220. In other words, since each LFSR sequence repeats, then the particular phase shift of each LFSR sequence may be controlled by the initial loading of the shift registers for each LFSR. As such, instead of running each of LFSRs 206, 212, and 216 at the same phase, i.e., the same state definition at any given point time, LFSRs 212 and 220 may instead be individually loaded with varying phase offsets.

Authentication blocks 210 and 218 are then tasked with the responsibility to insure that the proper phase offset is maintained by each of LFSR 212 and 220 with respect to the phase of LFSR 206. If the proper phase offset is maintained, for example, then sub-blocks 204 and 216 may be authenticated for continued operation. If, on the other hand, the proper phase offset is not maintained, i.e., a perturbation event has occurred, then operation is disabled.

Phase offsets may also be used to determine the amount of time that each of sub-blocks 204 and 216 may be authenticated for use. For example, given a 48-bit LFSR sequence, the amount of time required to traverse all $2^{48}-1$ state transitions using a 250 MHz clock rate is approximately 312.75 hours. In order to shorten the amount of time provided for authenticated use, therefore, a phase offset may be introduced into LFSRs 212 and 220. Using a phase offset, the LFSR may be programmed to traverse only a portion of the possible state space that is defined by the 48 stage LFSR. As such, the LFSR may be forced to reach its terminal count sooner. For example, the phase of the LFSR's state may be advanced such that only the last 10% of the LFSR's state space is traversed. In such an instance, the effective terminal count of the LFSR may be reduced from 312.75 hours to 31.275 hours, provided that the terminal count of the LFSR coincides with its state space epoch event, i.e., the point in time in which the state space of the LFSR repeats itself.

In an alternative embodiment, TLP 126 may instead instantiate LFSR 206 as a time-sensitive LFSR and LFSRs 212 and 220 as free-running LFSRs. In this instance, LFSR 206 provides additional comparison logic (not shown) to determine whether a terminal count is reached. If so, then the state of LFSR 206 is perturbed so that authentication blocks 210 and 218 fail to authenticate continued operation of sub-blocks 204 and 216. Thus, by using LFSR 206 as the time-sensitive LFSR, the entire set of sub-blocks 204 and 216 may be disabled. In particular, the state of LFSR 206 is compared to the state of the individual free-running LFSRs at each state transition to effectively disable the entire protected core 208 once LFSR 206 reaches its terminal count. Such an implementation, however, increases the susceptibility to attack, since only a single LFSR and its operational state are required to maintain continued operation of sub-blocks 204 and 216.

In an alternative embodiment, memory (not shown) may be added to the time-sensitive LFSR, so that upon disruption of operation of sub-blocks 204 and 216, the memory may preserve the state of the LFSR at the moment that operation was disrupted. Such may be the case, for example, if data activity at ports 214 and 222 is halted, such that operation of sub-blocks 204 and 216 is no longer needed. Once operation of sub-blocks 204 and 216 is reinstated, the LFSR state held persistent by the memory may be written back into the LFSR, such that the residual time left unused just prior to the disruption may be made available for use once operation is reinstated.

Figure 3:
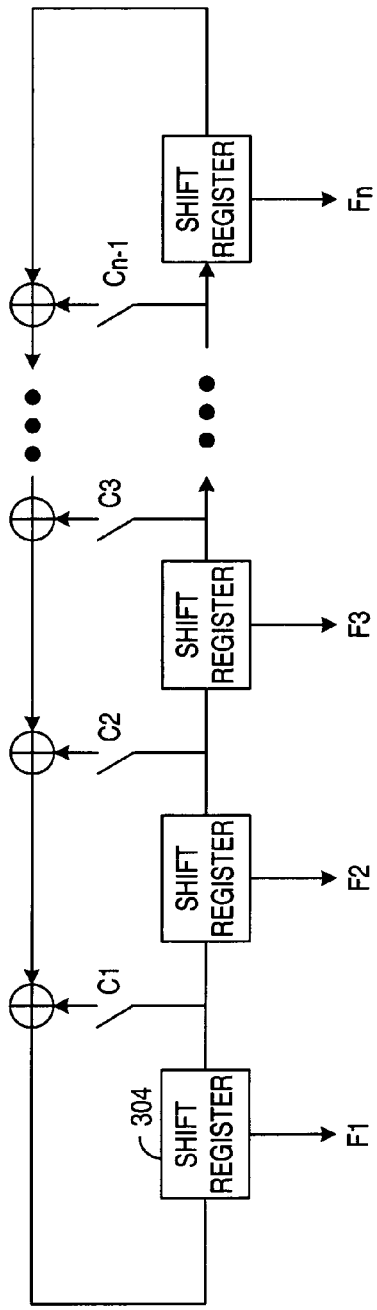
FIG. 3 illustrates an exemplary free-running linear feedback shift register (LFSR) block diagram.

Turning to FIG. 3, an exemplary block diagram of the free-running LFSR as discussed above in relation to FIG. 2 is illustrated. As can be seen, n stages of shift registers 304 are used as a delay line, which through feedback, has an input that is a function of its own state. The polynomial generated by the LFSR of FIG. 3 may be mathematically represented as:

$$f(x)=1+c_1x+c_2x+\ldots+c_{n-1}x^{n-1}+x^n, \quad (1)$$

where the coefficients, $c_1$-$c_{n-1}$, are equal to one if their corresponding switch is closed, and are equal to zero if their corresponding switch is open, as illustrated in FIG. 3. Thus, if switches c1 and c3 are closed, for example, then equation (1) may be rewritten as:

$$f(x)=1+x+x^3+x^4. \quad (2)$$

Independent of the polynomial being implemented, however, the bit sequence generated by the LFSR repeats after $2^n-1$ bits. The LFSR may be initialized by logic (not shown), so that the state of the LFSR is known and valid after each shift. The state of the free-running LFSR of FIG. 3 may be defined as:

$$S_{free-running}=\lfloor F_1F_2F_3\ldots F_n \rfloor, \quad (3)$$

where F1-Fn are the logic values stored within each shift register 304, which forms a word having a width equal to the number of shift registers used to implement the LFSR. At each transition of an input clock signal (not shown), therefore, the state of the free-running LFSR as defined by equation (3) changes in accordance with the polynomial defined by equation (2).

Figure 4:
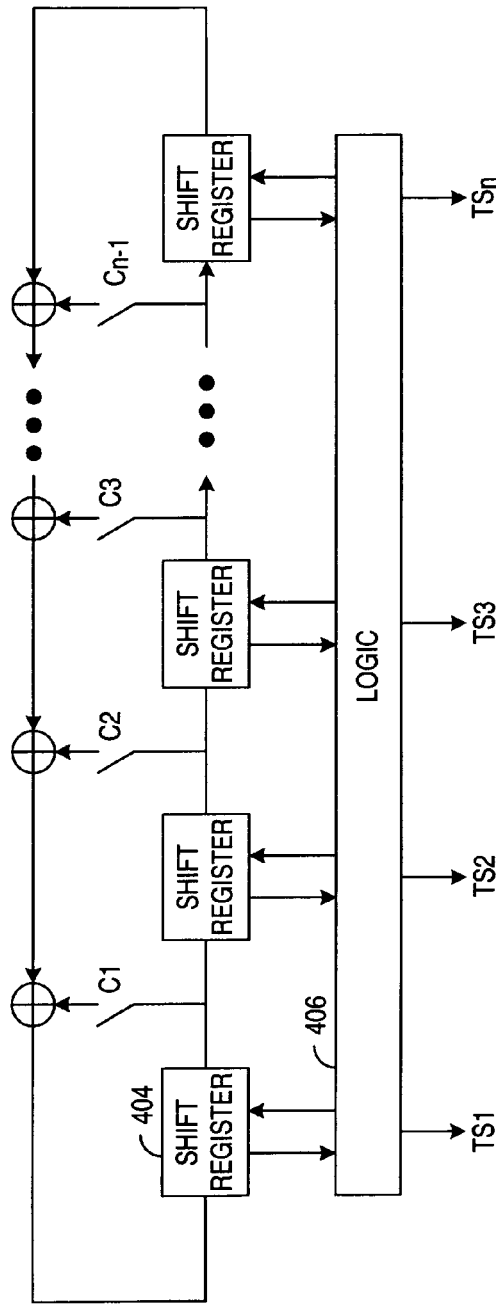
FIG. 4 illustrates an exemplary time-sensitive LFSR.

Turning to FIG. 4, an exemplary block diagram of the time-sensitive LFSR as discussed above in relation to FIG. 2 is illustrated. As can be seen, the LFSRs of FIG. 3 and FIG. 4 are identical, except for logic block 406 of FIG. 4. Logic block 406 implements at least two functions: 1) logic block 406 compares the logic value of each LFSR 404 to a predetermined terminal count; and 2) if each bit in the terminal count equals the logic value of the corresponding shift register, then logic block 406 perturbs the contents of one or more of shift registers 404.

The state of the time-sensitive LFSR may be defined as:

$$S_{LFSR}=[TS_1TS_2TS_3\ldots TS_n], \quad (4)$$

where TSa-TSn are the logic values stored within each shift register 404, which forms a word having a width equal to the number of shift registers used to implement the LFSR. During operation, the logic values of shift registers 404 are identical to the word defined by equation (4) after each clock transition. Perturbation of the logic values of shift registers 404 by logic block 406, however, results in an unexpected state at the next clock transition. The unexpected state is detected by the authentication blocks discussed above in relation to FIG. 2, which is then subsequently effective to render the corresponding sub-blocks inoperative.

Further, logic block 406 may initialize shift registers 404, such that the state defined by equation (4) represents a phase advanced state. For example, consider an initialization sequence that loads logic zeros into the least significant shift registers 404 and loads a logic one into the left most shift register. It can be seen, that the zero valued feedback will not affect the LFSR and the logic one will propagate through the shift registers until the logic one exists in the right most shift register. The number of clock cycles, T, required to position the logic one in the right most shift register is equal to n−1, where n is the total number of shift registers used to implement the LFSR. If, on the other hand, the initialization sequence loaded logic zeros into the most significant shift registers and loaded a logic one into the right most shift register, then a phase shift equal to T is effectively implemented, since T clock cycles were originally required to position the logic one into the right most shift register.

Figure 5:
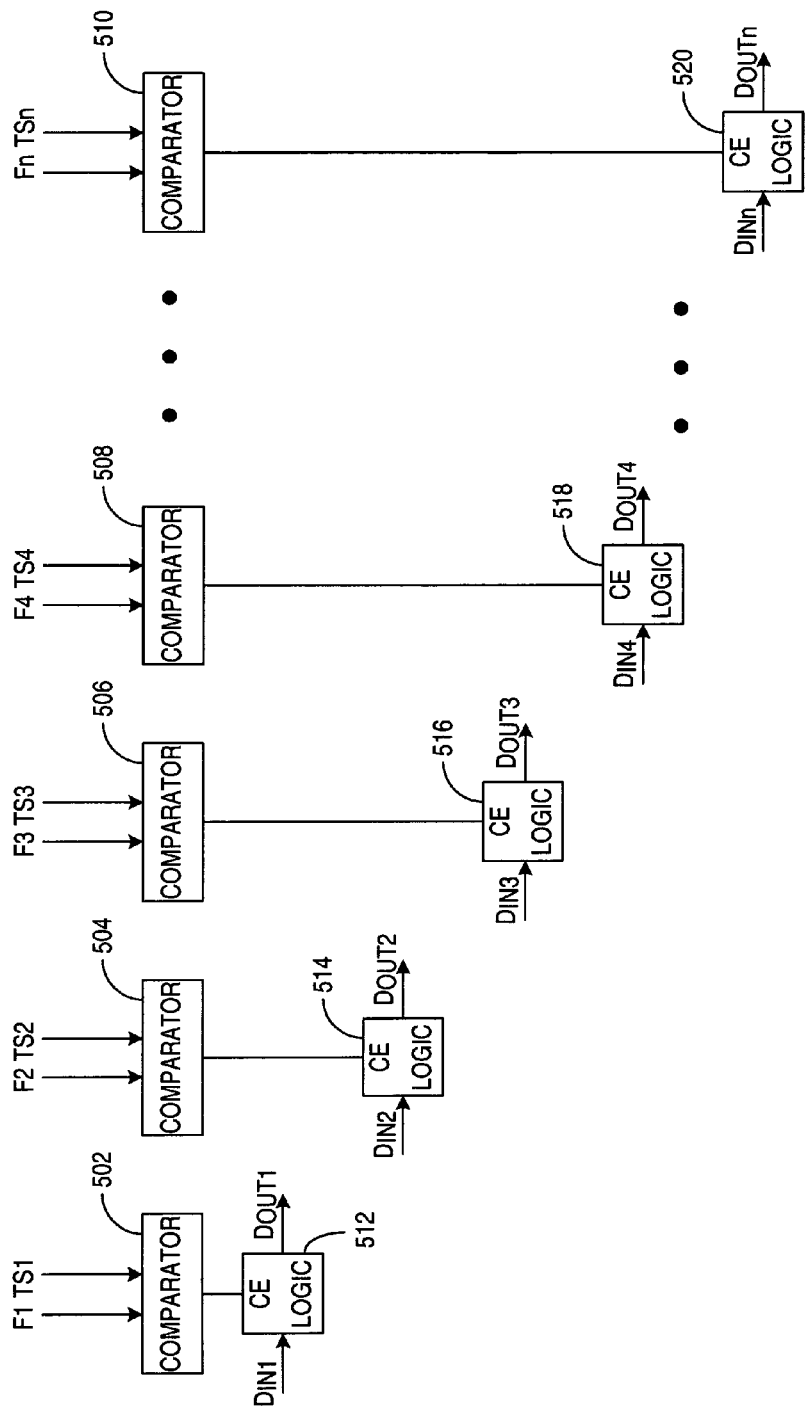
FIG. 5 illustrates an exemplary block diagram of the authentication block of FIG. 2.

Turning to FIG. 5, an exemplary block diagram of authentication blocks 210 and 218 as discussed above in relation to FIG. 2 is illustrated. In operation, $D_{IN1}$-$D_{INn}$ may represent, for example, data input 224 as accepted by sub-block 204, or data input 222 as accepted by sub-block 216. The logic output of comparators 502-510 determines whether logic blocks 512-520 are enabled, e.g., authenticated or validated, to propagate their respective data inputs to their respective data outputs $D_{OUT1}$-$D_{OUTn}$-Data outputs, $D_{OUT1}$-$D_{OUTn}$, may correspond, for example, to data outputs 214 or 226 of sub-blocks 204 or 216, respectively.

As illustrated in FIG. 5, comparators 502-510 each receive one bit of the free-running LFSR word as described by equation (3) and the corresponding bit of the time-sensitive LFSR word as described by equation (4). Thus, in one embodiment of LFSR word comparison, the number of comparators required to authenticate operation of the sub-block equals the number of stages implemented within each LFSR, i.e., n.

It can be seen, however, that other embodiments may be provided to reduce the number of comparators required. For example, the number of comparators required may be reduced by increasing the number of inputs accepted by each comparator. Thus, in an alternative embodiment, the number of comparators required may be reduced by half, if the number of inputs accepted by comparators 502-510 is doubled. Alternatively, the number of comparators required may be reduced by a quarter, if the number of inputs accepted by each comparator is quadrupled. In general, any arbitrary number of comparators of any arbitrary size may be used, depending on a user's requirements, and the number of comparators required may eventually be reduced to a single comparator, if the number of inputs accepted by the comparator is increased to n.

Logic blocks 512-520 may represent any logic resource that may be required to realize the logic hierarchy of sub-blocks 204 or 216 as synthesized by blocks 124-134 of FIG. 1. That is to say, for example, that logic blocks 512-520 may not only represent optimized look-up table (LUT) mappings, but may also represent logic resources, such as random access memory (RAM), multipliers, dedicated logic blocks and circuitry for storage elements, clock management, arithmetic functions, multiplexers, multipliers, shifters, processors, etc.

Accordingly, the output of each comparator 502-510 may be effective to render each logic block 512-520, respectively, in an operational mode, whereby continued operation is authenticated subsequent to a positive comparison of LFSR states. A positive comparison of LFSR states may be defined, for example, as the comparison of one or more bits of each LFSR state that yields an expected result. An expected result may be defined, for example, as a condition where one or more comparisons result in either an exact match, or mismatch, as expected.

Conversely, the output of each comparator 502-510 may be effective to render each logic block 512-520, respectively, in a disabled mode, whereby continued operation is not authenticated subsequent to a negative comparison of LFSR states. A negative comparison of LFSR states may be defined, for example, as the comparison of one or more bits of each LFSR state that yields an unexpected result. An unexpected result may be defined, for example, as a condition where one or more comparisons resulting in an exact match, were expected to result in a mismatch, or conversely, where one or more comparisons resulting in a mismatch, were expected to result in an exact match.

Figure 6:
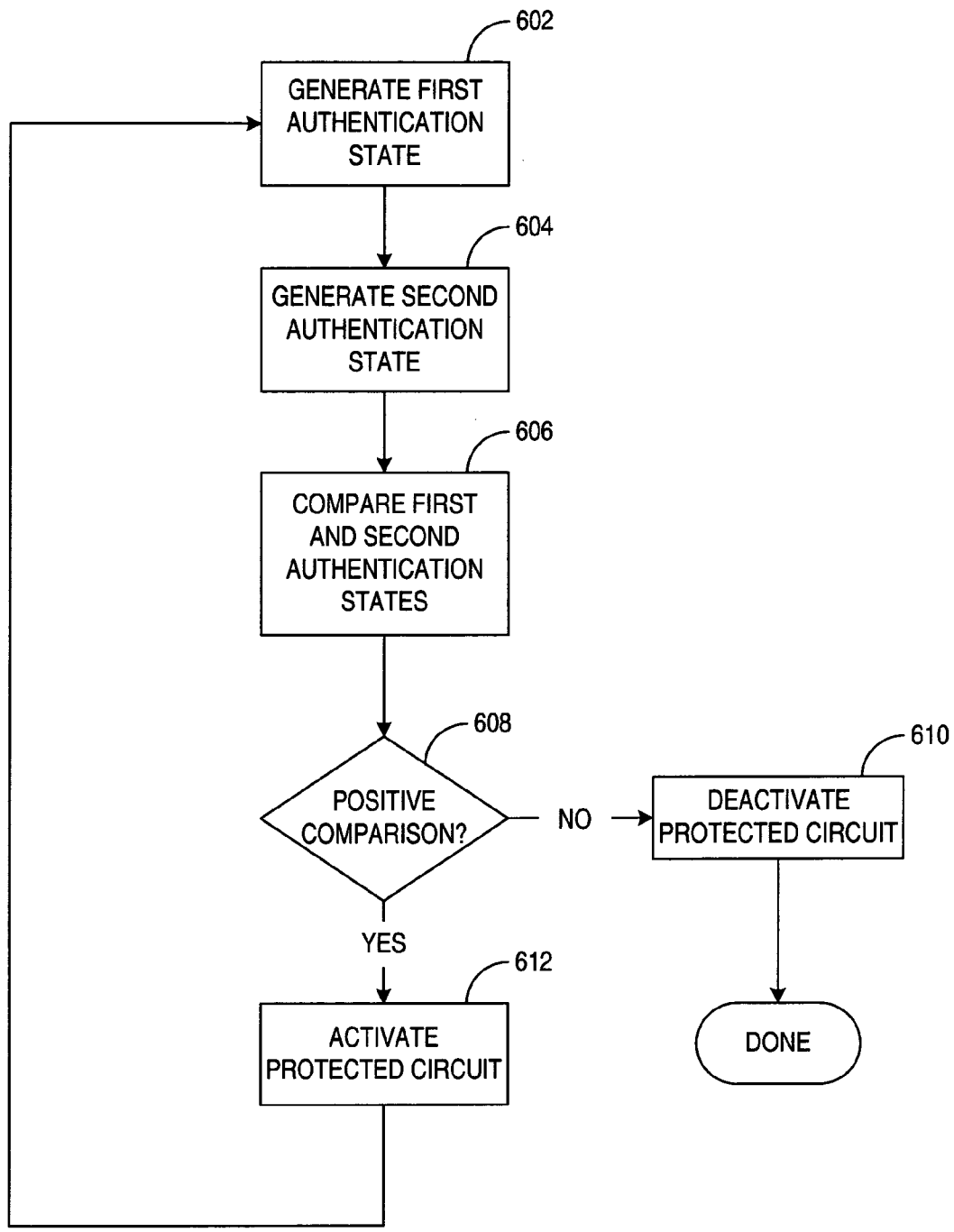
FIG. 6 illustrates an exemplary flow diagram in accordance with one embodiment of the present invention.

Turning to FIG. 6, an exemplary flow diagram is illustrated in accordance with one embodiment of the present invention. In steps 602 and 604, first and second authentication states are generated, for example, via LFSR 206 and LFSR 212, as exemplified in FIG. 2. Comparison 606 is performed via, for example, authentication block 210, which yields either a positive or negative result as determined in step 608.

Given a negative comparison, i.e., an unexpected result is obtained by the comparison of step 606, the NO path of step 608 is executed, whereby the protected circuit is deactivated as in step 610. Given a positive comparison, i.e., an expected result is obtained by the comparison of step 606, the YES path of step 608 is executed, whereby the protected circuit is activated for the duration of the current state as in step 612. The process may then be repeated at step 602 to either activate, or deactivate, the protected circuit for respective durations of subsequent states.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of limiting operation of a protected circuit, the method comprising:
    generating first authentication states using a first pseudorandom number (PN) generator of the protected circuit;
    generating second authentication states using a second PN generator of the protected circuit;
    wherein the first and second authentication states are generated in pairs, the first and second authentication states in each pair are equivalent in a number of successive pairs, each first authentication state is a function of a previous first authentication state, and each second authentication state is a function of a previous second authentication state;
    comparing each of the second authentication states to a terminal state, the terminal state providing a time limit on operation of the protected circuit;
    inverting at least one bit of one of the second authentication states in response to the one of the second authentication states being equal to the terminal state;
    comparing the first authentication states to the second authentication states;
    activating the protected circuit for operation in response to a positive comparison between the first and second authentication states; and
    deactivating the protected circuit for operation in response to a negative comparison between the first and second authentication states.

2. The method of claim 1, wherein generating the first authentication states comprises storing logic values within a plurality of shift registers of the first PN generator in accordance with a first polynomial.

3. The method of claim 2, wherein storing logic values comprises shifting the logic values from one shift register to one or more other shift registers in response to a transition of a clock signal input to the first PN generator.

4. The method of claim 3, wherein generating the second authentication states comprises storing logic values within a plurality of shift registers of the second PN generator in accordance with a second polynomial.

5. The method of claim 4, wherein storing logic values comprises shifting the logic values from one shift register to one or more other shift registers in response to a transition of a clock signal input to the second PN generator.

6. The method of claim 1, wherein comparing the first authentication states to the second authentication states comprises:
   selecting one or more bits from one of the first authentication states;
   selecting one or more bits from one of the second authentication states;
   comparing the selected bits from the first and second authentication states; and
   generating a result in response to the comparison.

7. The method of claim 6, wherein generating the result comprises generating the positive comparison when the result of the comparison matches a predetermined result.

8. The method of claim 7, wherein generating the result comprises generating the negative comparison when the result of the comparison does not match a predetermined result.

9. The method of claim 1, wherein activating the protected circuit comprises enabling one or more logic circuits within the protected circuit to operate in accordance with a programmed configuration.

10. The method of claim 9, wherein deactivating the protected circuit comprises preventing one or more logic circuits within the protected circuit from operating in accordance with the programmed configuration.

11. A programmable device comprising:
   a plurality of reconfigurable resources coupled to receive configuration data and adapted to implement a plurality of functions in response to the configuration data;
   a protected core implemented by a first portion of the reconfigurable resources, the protected core including,
      a first sequence generator adapted to generate a first validation sequence;
      a plurality of second sequence generators adapted to generate a respective one of a plurality of second validation sequences;
      wherein the first validation sequence includes a plurality of first pseudo-random numbers (PNs), each second validation sequence includes a plurality of second PNs, each first PN is a function of a previous first PN, and each second PN is a function of a previous second PN;
      wherein each combination of the first sequence generator with one of the second sequence generators generates pairs of the first and second PNs, the first and second PNs in each pair are equivalent in a number of successive pairs;
      a plurality of comparison circuits corresponding to the plurality of second sequence generators, respectively, wherein each comparison circuit compares each second PN of the corresponding second sequence generator to a terminal value, the terminal value providing a time limit on operation of the protected core;
      a perturbation circuit coupled to the plurality of second sequence generators, the perturbation circuit configured to invert at least one bit of the second PN generated by one of the second sequence generators in response to the second PN from the one of the second sequence generators being equal to the terminal value; and
      a plurality of protected circuits coupled to receive the first validation sequence, each protected circuit coupled to receive a respective one of the plurality of second validation sequences, wherein an operational state of each protected circuit is established in response to a comparison of the first validation sequence with the respective second validation sequence.

12. The programmable device of claim 11, wherein the first sequence generator comprises a first pseudo-random number (PN) generator.

13. The programmable device of claim 12, wherein the first PN generator comprises a first linear feedback shift register (LFSR).

14. The programmable device of claim 13, wherein the first LFSR comprises a first plurality of shift registers coupled in series, each shift register adapted to store one bit of the first validation sequence.

15. The programmable device of claim 14, wherein each one of the plurality of second sequence generators comprises a second PN generator.

16. The programmable device of claim 15, wherein the second PN generator comprises a second linear feedback shift register (LFSR).

17. The programmable device of claim 16, wherein the second LFSR comprises:
   a second plurality of shift registers coupled in series, each shift register adapted to store one bit of the second validation sequence; and
   wherein the perturbation circuit is coupled to the second plurality of shift registers, the perturbation circuit being adapted to alter a logic state of the second plurality of shift registers.

18. The programmable device of claim 17, wherein each one of the plurality of protected circuits comprises:
   at least one comparator circuit coupled to receive one or more bits of the first validation sequence and corresponding bits of the respective second validation sequence and adapted to compare the first and respective second validation sequence bits to provide an authentication signal in response to the comparison; and
   at least one circuit coupled to receive the authentication signal and adapted to operate in accordance with the configuration data in response to a first state of the authentication signal and adapted to be disabled in response to a second state of the authentication signal.

19. A computer-readable medium having instructions stored thereon, the instructions being executable by a computing system for synthesizing a design by performing steps comprising:
   receiving source code indicative of the design;
   synthesizing the source code into configuration data, wherein synthesizing includes,
      generating a protected circuit definition;
      generating first and second pseudo-random number (PN) generators;
      wherein the first and second PN generators generate pairs of first and second PNs, the first and second PNs in each pair are equivalent in a number of successive pairs, each first PN is a function of a previous first PN, and each second PN is a function of a previous second PN;
      generating a comparison circuit for comparing each of the second PNs to a terminal number, the terminal number providing a time limit on operation of the protected circuit;
      generating a circuit for inverting at least one bit of output of the second PN generator in response to the one of the second PNs being equal to the terminal number; and
      generating at least one authentication circuit, wherein the authentication circuit compares outputs of the PN generators to validate operation of the protected circuit in response to a positive comparison.

20. The computer-readable medium of claim 19, wherein the step of generating the at least two PN generators further comprises generating a logic circuit coupled to a first of the PN generators, the logic circuit adapted to detect a terminal sequence of the first PN generator and further adapted to perturb the output of the first PN generator in response to the detection of the terminal sequence.

* * * * *